United States Patent
Oba et al.

[11] Patent Number: 6,080,358
[45] Date of Patent: *Jun. 27, 2000

[54] METHOD FOR FORMING COMPACTS

[75] Inventors: Takeshi Oba, Shonan-machi; Yoshimi Sugaya, Funabashi, both of Japan

[73] Assignee: Hitachi Powdered Metals Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/215,959

[22] Filed: Dec. 18, 1998

[30]     Foreign Application Priority Data

Dec. 24, 1997  [JP]  Japan ..................................... 9-366483
Dec. 26, 1997  [JP]  Japan ..................................... 9-368272

[51] Int. Cl.$^7$ ........................................................ B22F 3/12
[52] U.S. Cl. .................................................. 419/5; 419/38
[58] Field of Search ............................................ 419/5, 38

[56]               References Cited
              U.S. PATENT DOCUMENTS

| 4,111,031 | 9/1978 | Vennemeyer et al. | 72/359 |
| 4,145,798 | 3/1979 | Sarnes | 29/148.4 R |
| 4,435,359 | 3/1984 | Eiselstein et al. | 419/3 |
| 4,853,180 | 8/1989 | Howard | 419/66 |
| 5,543,235 | 8/1996 | Mirchandani et al. | 428/547 |
| 5,710,969 | 1/1998 | Newman | 419/5 |

FOREIGN PATENT DOCUMENTS

| 0 521 179 | 1/1993 | European Pat. Off. . |
| 4-327398 | 11/1992 | Japan . |
| 792056 | 3/1958 | United Kingdom . |
| 96/33832 | 10/1996 | WIPO . |

*Primary Examiner*—Daniel J. Jenkins
*Attorney, Agent, or Firm*—Scully, Scott, Murphy & Presser

[57]               ABSTRACT

There is disclosed a method for forming compacts having a hole extending along a direction crossing the compressing direction. In the method, a powder or a pre-compressed compact and a core for forming a hole are assembled in a cavity. The core and a die are set in a condition that the core can move in the compressing direction. The punch compresses the powder and forms a compact. The core does not engage with the die, whereby the core is not exerted with load. Therefore, the method does not need control of compressing for avoiding exertion of load on the core, and can prevent transformation or break of the core. The compact in which the core is inserted is drawn out from the die, so that damages such as break or crumble of the compact is prevented in drawing out.

8 Claims, 12 Drawing Sheets

(a)

(b)

(c)

(d)

METHOD FOR FORMING COMPACTS

BACKGROUND OF THE INVENTION

This invention relates to a method for forming compacts used for materials of sintered products by compressing a law material powder in the powder metallurgical fields. Specifically, this invention relates to a method advantageously used in the case that the sintered products are hollow members such as a pipe or a nut having a through hole, alternatively, the products have one or more special through hole(s), abutment(s), groove(s), or the like. Wherein, the hole is formed in a direction crossing the compressing direction in forming the compact.

When a compact with a pipe-shaped cylindrical body is formed, in the past, powder is filled in a cavity of dies in which a core rod with cylindrical shape is located up and down so as to form a hole in the pipe. Then, an upper punch and a lower punch compress the powder in the direction toward the axis of the pipe. In this case, the direction of the compression by the upper and lower punches is parallel with the hole in the pipe. However, such an ordinary method poses problems of low loading properties of powder. For example, the loading density of powder in dies cannot be stable, and the length of the product is restricted since the loading depth of the powder cannot be sufficiently kept. Moreover, the method clearly poses problem of so called neutral zone. That is, the green density at the center portion (neutral zone) between the upper and lower punches becomes the lowest, thereby sometimes leading to low quality. Furthermore, the compact cannot be easily taken out from the die, and cannot be easily handled. These problems become more serious as the length in the direction of the compression is long.

In order to solve the above problems, it has been proposed to change the direction of the compression in the case that the pipe such as above is formed. That is, the direction of compression is set in the direction perpendicular to the hole of the pipe, namely the direction of the diameter of the pipe. For example, the applicant has been proposed in Japanese Patent Unexamined Publication (Kokai) No. 4-327398, inserting a core rod into a lateral hole formed in a die, thereby traversing a cavity, and compressing powder filled in the cavity by an upper punch and a lower punch, thereby obtaining a compact. According to the proposed method, the lording depth of the powder can be shallow, so that the loading properties of powder improves and the loading density becomes approximately even over the upper and lower zone, thereby inhibiting occurrence of a neutral zone as low as possible. Moreover, the compacts can be easily drawn out from the die and easily handled. In addition, in the case that a screw or a gear is formed on the inner surface of the hole, the green density of that portion can be sufficiently kept.

According to the method for forming compacts described in the above official gazette, the core rod traverses the cavity and the both ends thereof are inserted in the lateral holes of the die in compressing the powder. Therefore, the core rod is exerted with load that bends the rod. When the load is large, the core rod may transform, or break in an extreme case. The official gazette discloses locating the core rod at the neutral zone of the powder to avoid the above-mentioned trouble. However, the location of the core rod cannot easily controlled, whereby the technique cannot be practically used. Moreover a pipe or a nut illustrated in the gazette can be formed through locating the core rod at the neutral zone by crossing the core rod perpendicularly to the compressing direction. However, there is the case that a hole inclines with respect to the compressing direction, or the core rod cannot be located at the neutral zone since the hole is off set from the center portion of the compressing directions. In such cases, the core rod is exerted with load, so that practical use is impossible.

In general, powder in a cavity is loaded with vibration, so that the loading density is made even. However, sometimes the evenness is not sufficient, whereby the compact obtained by compressing the powder with uneven loading density is uneven in the green density, so that products having sufficient qualities cannot be obtained. More specifically, in the case that the product has a thin portion, it is difficult to make even the loading density of the powder. Therefore, improvement for good qualities is desired. In addition, the core rod is drawn out from the die when the compact is in the die, then the die is downwardly moved so as to draw out the compact. At that time, the compact is rubbed with the die, so that there is the possibility of occurrence of damages such as breaking or crumbling. Such a trouble tends to occur remarkably when the products have thin portions, namely the differential of the outer diameter and the inner diameter of the product is small.

SUMMARY OF THE PRESENT INVENTION

It is, therefore, an object of the present invention to provide a method for forming pipe-shaped compacts by locating a core rod in a cavity along the direction perpendicular to the compressing direction. Wherein, the core rod is not exerted with load in compressing, controlling for avoiding the load is easy or not necessary, green densities can be even, thereby improving qualities, and damages of compacts can be prevented.

The invention provides a method for forming compacts having a hole extending along a direction crossing the compressing direction. The method comprises: preparing a powder or a pre-compressed compact having a lower green density than the compact to be formed; setting a core with the powder or the pre-compressed compact in a cavity of a die in a condition that the core can move toward the compressing direction; compressing the powder or the pre-compressed compact by a die inserted into the cavity so as to form a compact; drawing out the compact with the core from the die; and drawing out the core from the compact.

In a general method, the entire powder for forming a compact is loaded in a cavity, and the powder is compressed. The invention includes preparing a pre-compressed compact having lower green density than the compact, assembling the pre-compressed compact with the core, and compressing the pre-compressed compact. The invention is specified by setting a condition that the core can move in the compressing direction, in setting the powder or the pre-compressed compact with the core in the cavity of the die.

The core does not engage with the die, and is free from the die, whereby the core can move in the compressing direction in compressing the powder or the pre-compressed compact. Therefore, in compressing, the core is not exerted with load that may transforms the core if it is bonded with the die. Hence, troubles such as transformation or damage of the core do not occur. Moreover, precise control for locating the core at the neutral zone is not required, whereby the compact can be easily formed.

As a concrete embodiment of setting in compressing a powder, loading a part of the said powder for forming a compact into the cavity; putting the core on the powder; and loading the balance of the powder into the cavity are preferably employed to the invention. The core is merely put on the powder that is initially loaded, so that it can move in the compressing direction. As another concrete embodiment, setting the core in the cavity; and loading the entire powder for forming a compact into the cavity are employed to the invention. The invention can employ a pair of jigs for stably keeping the core in the cavity.

On the other hand, when the pre-compressed compact is compressed, the following steps are preferable. At first, a plurality of pre-compressed compacts that are capable of handling are formed. The pre-compressed compact has a configuration that is the compact is divided into pieces, whereby the assembled configuration is similar to the compact. Then, the pre-compressed compacts with the core are assembled so as to be similar to the compact, and set in the cavity. The core is set in a condition that it can move in compressing direction. A pair of jigs for stably keeping the core in the cavity can be used. In the following compressing step, the pre-compressed compacts are compressed by the die and bonded each other.

In the method including compressing and bonding the pre-compressed compacts, a plurality of pre-compressed compacts are compressed and bonded so as to form the final compact, so that even though the green density of the pre-compressed compact is not even, the green density is adjusted in the actual compressing, whereby the green density of the compact becomes even and the quality thereof is improved. Moreover, we can manufacture and stock a large amount of the pre-compressed compacts, and can form compacts as occasion demands. Therefore, the operations of mixing and loading powder in every forming of the compacts are eliminated, thereby enhancing productivity.

It should be noted that the meaning of "capable of handling" is that we can carry it by our hand without crumbling. More specifically, such a pre-compressed compact having a suitable green density can be formed by compressing a powder, or by compressing a powder into lower green density than the above and pre-sintering at a temperature ranging from 30 to 65% of the actual sintering temperature of the compact.

The green density of the pre-compressed compact, which is preliminarily formed, must be capable of handling, and required a certain green density that enables bonding adjacent pre-compressed compacts each other in compressing. The pre-compressed compacts easily bond as the green density is low. However, the green density is too low, handling would be impossible. It is known that bonding is possible when the green density ratio (ratio of the green density of the compact with respect to the true density of the metal with the same chemical composition) is less than 76%. When the green density ratio is 76% or more, undesirable crack easily occurs at the bonding boundary. Therefore, the green density of the pre-compressed compact is chosen from the range so that the green density ratio becomes less than 76%, and the pre-compressed compact can be handled, preferably in the range of 60 to 75%. For example, when the powder is made from an iron type material, the green density may be ranging from 4.7 to 5.9 g/cm$^3$. When the powder is made from an aluminum type material, the green density may be ranging from 1.6 to 2 g/cm$^3$. When the powder is made from a copper type material, the green density may be ranging from 5.3 to 6.6 g/cm$^3$.

The pre-compressed compact is preferably formed with an extra wall portion with respect to the actual wall portion. The extra wall portion may be crushed into the actual wall portion in compressing so as to enhance the green density. Furthermore, the extra wall portion preferably has a configuration that is fitted into an insertion hole of the die, so that the pre-compressed compact can be stably set.

BRIEF DESCRIPTION OF THE DRAWINGS

In FIG. 17(a) is a perspective view showing a pre-compressed compact according to the sixth embodiment of the invention, (b) is a front view of that.

DETAILED DESCRIPTION OF THE INVENTION

(1) First Embodiment

Figure 1:
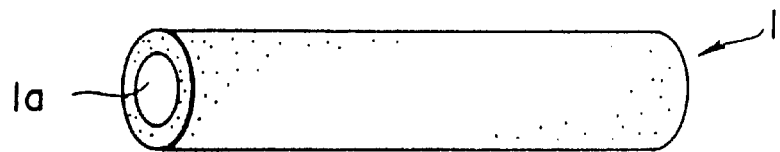
FIG. 1 is a perspective view showing a compact formed in each embodiment.

FIG. 1 shows a compact 1 formed by the forming method according to the first embodiment. FIG. 2(a) to (e) shows an apparatus and forming steps for forming the compact 1. The compact 1 is a cylindrical pipe having a long axial length compared to the outer diameter and a hole 1a extending along the entire length of the axis of the pipe. The compact 1 is made into a sintered body through a sintering step.

Figure 2:
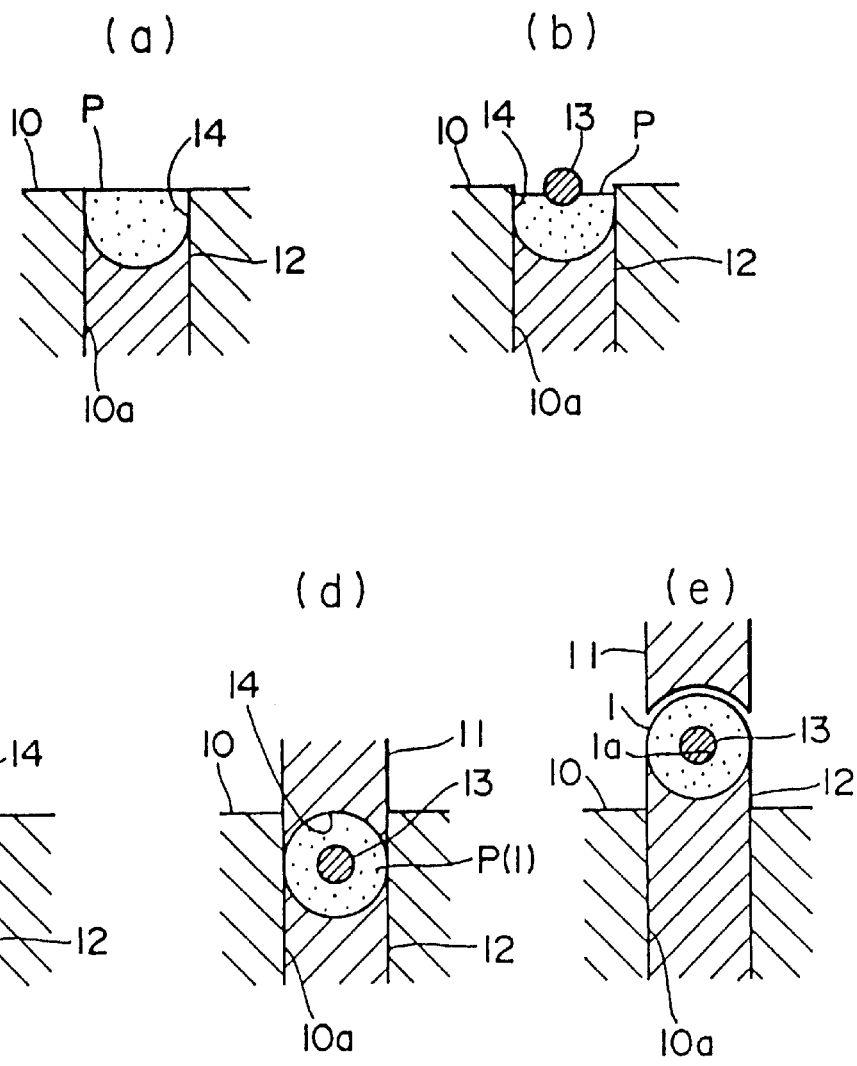
FIG. 2(a) to (e) is a front cross section showing steps in order for forming a compact according to the first embodiment.
Figure 3:
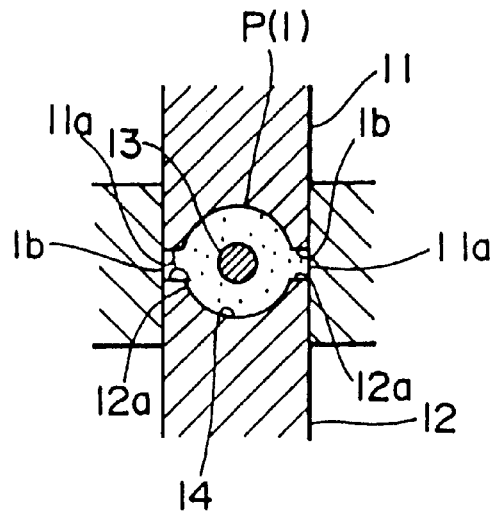
FIG. 3 is a front cross section showing the detail of FIG. 1(d).

As shown in FIG. 2, the apparatus for forming the compact 1 equips a die 10, an upper punch 11, a lower punch 12, a cylindrical core rod 13 for forming the hole 1a. The die 10 is formed with an insertion hole 10a into which the upper and lower dies 11, 12 are inserted in a sliding connection, whereby a cavity 14 for loading a powder P can be formed. The insertion hole 10a for forming the cavity 14 has a width and a length respectively coincide with the diameter and the axial length of the compact 1 to be formed. The formed compact 1 is made into a sintered body. A finishing such as sizing may carried out to the sintered body so as to obtain the final product (pipe). In this case, therefore, the size of the compact 1 is set slightly larger than the size of the finally produced product.

The working faces of the upper and lower punches 11, 12 each has a groove having a circular cross section for forming an outer surface of the compact 1. More specifically, the both ends of the upper and lower punches 11, 12 are formed with clearance surfaces 11a, 12a having a certain width respectively so as to prevent collision of the punches 11, 12 or to be hard to break if the punches 11, 12 are in collision with each other.

The core rod 13 has an outer diameter that coincides with the hole 1a of the compact 1 for forming the hole 1a. The axial length (the length toward the front and reverse direction of the sheet in FIG. 2) of the core rod 13 is slightly shorter than the length of the cavity 14, so that the core rod 14 is housed in the cavity 14 in such a way that the axial direction of the core rod 13 extends along the longitudinal direction of the cavity 14.

The steps for forming the compact 1 using the forming apparatus will be explained hereinafter in order. The steps can be carried out automatic controlling apparatus.

A. Setting Step

As shown in FIG. 2(a), the lower punch 12 enters into the insertion hole 10a of the die 10 from the bottom, and elevates to the position where powder is initially loaded. Then a part of the powder P is loaded in the cavity 14 formed by the die 10 and the lower punch 12.

Next, as shown in FIG. 2(b), the core rod 13 is positioned on the center of the powder P in such a way that the axial direction of the core rod 13 horizontally extends along the longitudinal direction (the length toward the front and reverse direction of the sheet in FIG. 2) of the cavity 14. In that case, the core rod 13 is housed in the cavity 14 in the condition that the lower portion of the core rod 13 is buried in the powder P. The depth of the buried portion of the core rod 13 in the powder P and the quantity of the load ed powder P should be adjusted in such a condition that the core rod 13 is located at the neutral zone in compressing.

Figure 4:
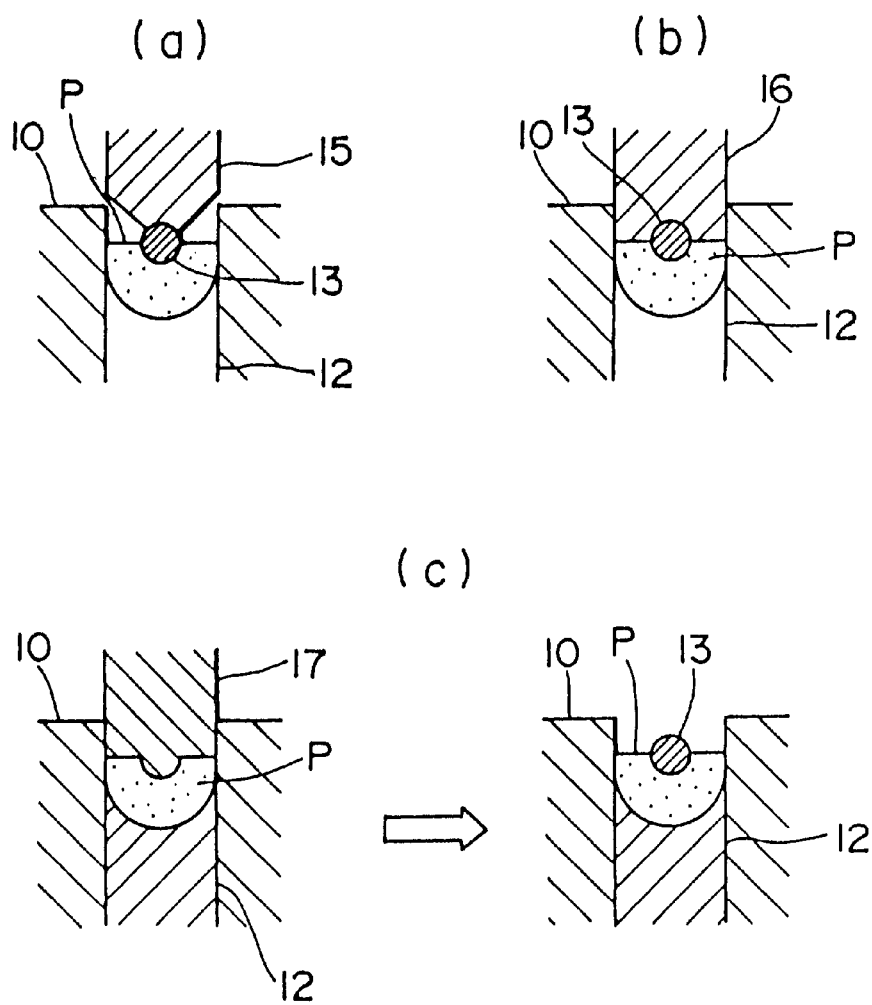
FIG. 4(a) to (c) is a front cross section showing a preferable means for carrying out the setting step according to the first embodiment.

It should be noted that, in order to certainly locate the core rod 13 and make it stable on the powder P, the following operations preferably employed. That is, as shown in FIG. 4(a), a punch 15 having a groove fitted by the core rod 13 presses down the lower portion of the core rod 13 into the powder P. Alternatively, as shown in FIG. 4(b), a punch 16 having a groove fitted by the core rod 13 presses down the lower portion of the core rod 13 into the powder P and compresses the powder P in a certain extent. Furthermore, as shown in FIG. 4(c), a punch 17 compresses the powder P in a certain extent forming a groove, in which the core rod 13 is housed.

Then, the lower punch 12 goes down to the final loading position, and the balance of the powder P is loaded in the cavity 14 so as to cover the core rod 13 by the powder P.

B. Compressing Step

As shown in FIG. 2(d), the upper punch 11 enters into the cavity 14, and the upper and lower punches 11, 12 compress the powder P, thereby forming a compact 1. The compressing direction by the upper and lower punches 11, 12 is perpendicular to the core rod 13.

C. Drawing Out Step

As shown in FIG. 2(e), the upper punch 11 elevates, and the die 10 goes down alternatively the lower punch 12 elevates, whereby the compact 1 with the core rod 13 is drawn out from the die 10. Then, the core rod 13 is drawn out from the compact 1. In the compact 1, the stress due to the compressing is released when the core rod 13 is drawn out from the die 10. As a result, a spring back occurs in the compact 1, whereby the core rod 13 can be easily drawn out from the compact 1.

Thus obtained compact 1 includes linear protrusions 1b that are formed by the clearance surfaces 11a, 12a formed on the upper and lower punches 11, 12. Compressing the powder P between the clearance surfaces 11a, 12a forms the linear protrusion 1b, extending along the axial direction. The linear protrusions 1b are eliminated after sintering the compact 1 as occasion demands by finishing the sintered body by means of sizing or machining, and the like.

According to the first embodiment, the core rod 13 that is positioned in the cavity 14 for forming the hole 1a of the compact 1 does not engage with the die 10 and is free from the die 10, so that the core rod 13 can move in the compressing direction with respect to the die 10 in compressing the powder P. Therefore, in compressing the powder P, the core rod 13 is not exerted with load that transforms the core rod 13 if it is bonded with the die 10. Hence, troubles such as transformation or damage of the core rod 13 do not occur. Moreover, the core rod 13 can move in the compressing direction without bonding with the die 10 in compressing the powder P, so that precise control for locating the core rod 13 at the neutral zone is not required, and the compact 1 can be easily formed. In addition, the core rod 13 is housed in the compact 1 when the compact 1 is drawn out from the die 10, so that the compact 1 does not break or crumble when the compact 1 is drawn out.

(2) Second Embodiment

The second embodiment for forming the compact 1 according to the invention will be explained hereinafter.

FIG. 5(a) to (f) shows an apparatus and forming steps for forming the compact 1. As shown in FIG. 5, the apparatus equips; a die 20 comprising upper outer die 21 and lower outer die 22, an upper inner die 23 and a lower inner die 24; an upper punch 25; a lower punch 26; and a core rod 13. The upper and lower inner dies 23, 24 are inserted into the lower outer die 22 in a sliding connection, and capable of coming into contact each other. The upper outer and inner dies 21, 23 are formed with insertion holes 21a, 23a respectively, into which the upper punch 25 is inserted in a sliding connection. The lower inner die 24 is formed with an insertion hole 24a, into which the lower punch 26 is inserted in a sliding connection. A cavity 27 for forming the compact 1 is formed by the upper and lower punches 25, 26 and the upper and lower inner dies 23, 24. The sizes of the cavity 27 and the core rod 13 are set in correspondence to the compact 1 to be formed. The width of the insertion hole 23a of the upper inner die 23 (the length along the right and left direction in FIG. 5) is set in a certain size in which the core rod 13 can pass through.

The steps for forming the compact 1 using the above forming apparatus will be explained hereinafter in order.

A. Setting Step

As shown in FIG. 5(a), the lower inner die 24 enters into the lower outer die 22, and elevates to the position where the upper surface of the lower inner die 24 coincides with the upper surface of the lower outer die 22. The lower punch 26 elevates to the position where the upper end thereof is located below the cavity 27 of the lower inner die 24 and powder is initially loaded. Then a part of the powder P is loaded in the cavity 27 formed by the lower inner die 24 and the lower punch 26.

Figure 5:
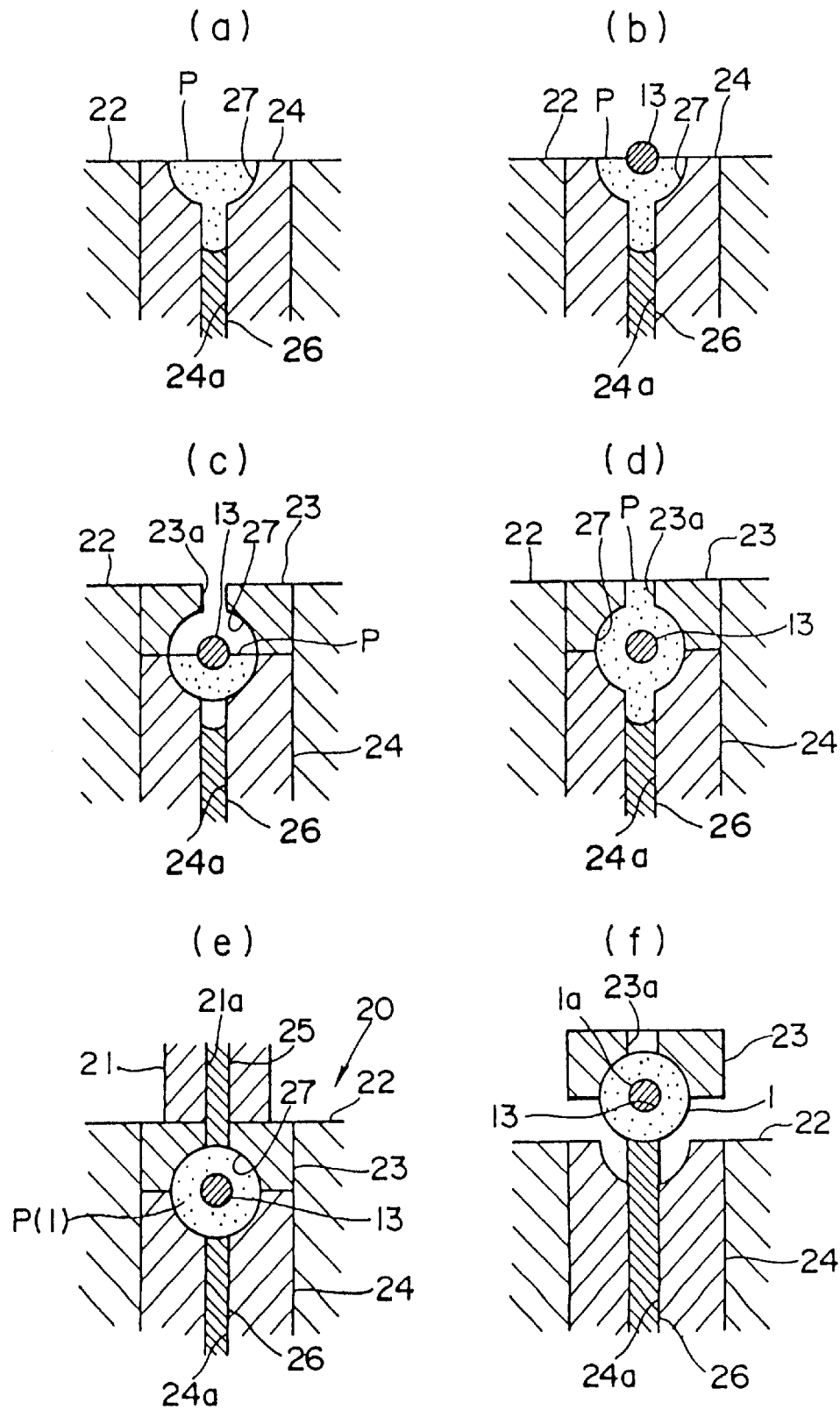
FIG. 5(a) to (f) is a front cross section showing steps in order for forming a compact according to the second embodiment.

Next, as shown in FIG. 5(b), the core rod 13 is positioned on the center of the powder P in such a way that the axial direction of the core rod 13 horizontally extends along the longitudinal direction (the length toward the front and reverse direction of the sheet in FIG. 5) of the cavity 14. In that case, the core rod 13 is housed in the cavity 27 in the condition that the lower portion thereof is buried in the powder P. The depth of the buried portion of the core rod 13 in the powder P and the quantity of the loaded powder P should be adjusted in such a condition that the core rod 13 is located at the neutral zone in compressing. In setting the core rod 13 on the powder P such as above, the above-mentioned method shown in FIG. 4(a) to (c) can be employed. Then, as shown in FIG. 5(c), the lower inner die 24 and the lower punch 12 goes down to the final loading position, the upper inner die 23 goes down and comes into contact with the lower inner die 24.

Then, as shown in FIG. 5(d), the balance of the powder P is loaded in the cavity 27 so as to cover the core rod 13 by the powder P.

B. Compressing Step

As shown in FIG. 5(e), the upper outer die 21 goes down and comes into contact with the upper inner die 23, simultaneously the upper punch 25 enter into the cavity 25. Then the upper and lower punches 25, 26 compress the powder P, thereby forming a compact 1. The compressing direction by the upper and lower punches 25, 26 is perpendicular to the core rod 13.

C. Drawing Out Step

As shown in FIG. 5(f), the upper outer die 21 (not shown) elevates, and the upper inner die 23 and the upper punch 25 (not shown) elevate. Then, the lower punch 26 elevates, alternatively the lower outer die 22 goes down, whereby the compact 1 with the core rod 13 is drawn out from the lower inner die 24. Then, the core rod 13 is drawn out from the compact 1.

According to the second embodiment, as well as the first embodiment, the same advantages based on that the core rod 13 is not exerted with load that transforms the core rod 13 in compressing the powder P can be obtained. Additionally, the inner surface of the cavity 27 can have a profile coincident with the compact 1 to be formed by the combination of the upper and lower inner die 23, 24, and the clearance surface for avoiding the collision of the upper and lower die 25, 26 such as the first embodiment is not required. Therefore, a linear protrusion 1b such as the case of the compact 1 in the first embodiment is not formed, thereby facilitating the finishing after sintering.

(3) Third Embodiment

The third embodiment for forming the compact 1 according to the invention will be explained hereinafter.

Figure 7:
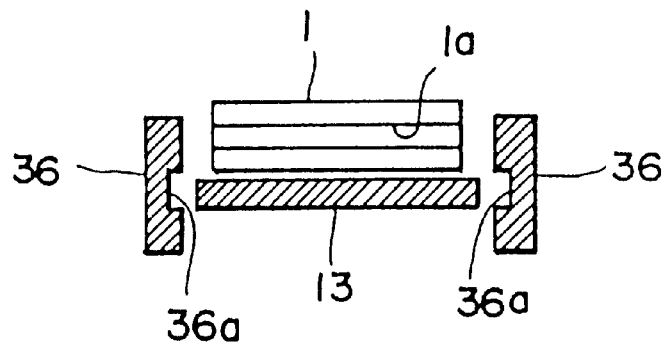
FIG. 7 is a side cross section showing a pair of jigs used for forming a compact according to the third embodiment.
Figure 8:
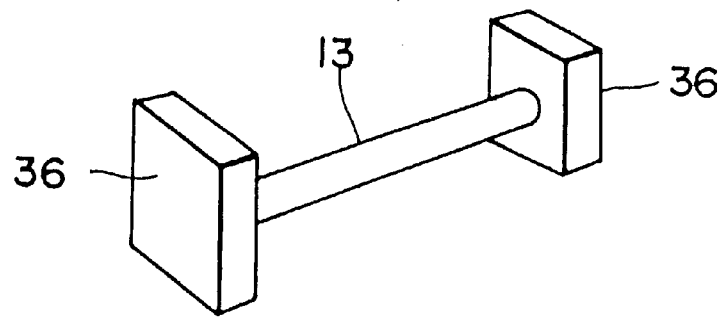
FIG. 8 is a perspective view showing the jigs
Figure 9:
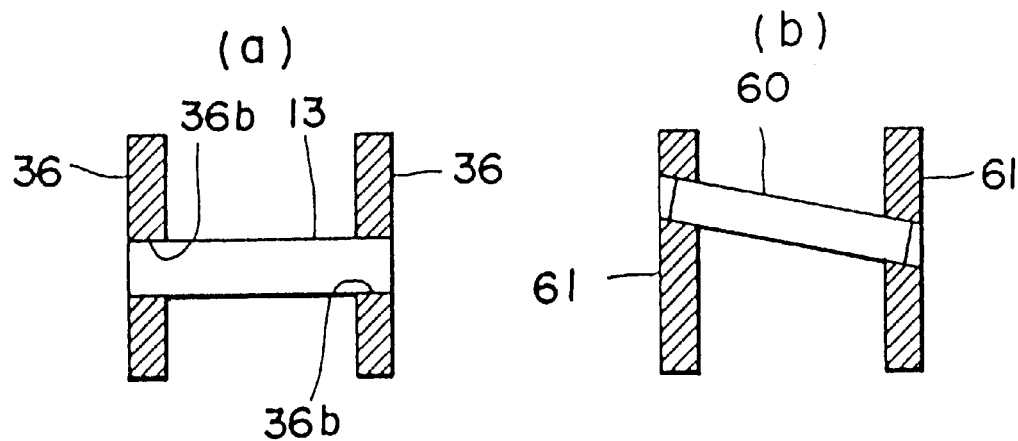
FIG. 9(a), (b) is a side cross section showing arrangements of the jigs.

FIG. 6(a) to (e) shows an apparatus and forming steps according to the third embodiment. As shown in FIG. 6, the apparatus equips a die 30 having a jig supporting die 32 supported by an outer die 31 in a sliding connection. The apparatus also equips an upper and lower punches 34,35 similarly as the upper and lower punches 11, 12 of the first embodiment. The upper and lower punched 34,35 are inserted into an insertion hole 32a in a sliding connection and form a cavity 33. The apparatus further equips the core rod 13 for forming the hole 1a of the compact 1, and a pair of jigs 36 for supporting the core rod 13. As shown in FIG. 7 and FIG. 8, the jigs 36 are square plates, of those opposing surfaces are formed with an abutment 36a respectively at the center thereof. The end of the core rod 13 is removably fitted into the abutment 36a. As shown in FIG. 9(a), a hole 36b into which the end of the core rod 13 is removably fitted can be employed instead of the abutment 36a. The jig supporting die 32 is supported by a cushioning device such as an air cylinder or a spring (not shown) so as to elastically go down.

The steps for forming the compact 1 using the forming apparatus will be explained hereinafter in order.

A Setting Step

As shown in FIG. 6(a), the jig-supporting die 32 elevates to the position where the upper surface thereof coincides with the upper surface of the outer die 31. The lower punch 35 that is inserted into the insertion hole 32a of the jig-supporting die 32 from the bottom elevates to the position where powder is initially loaded. Then a part of the powder P for use is loaded in the cavity 33 formed by the jig supporting die 32 and the lower punch 35.

Next, jigs 36 that are fitted by the end of the core rod 13 respectively are put on the both ends of the jig-supporting die 32 in longitudinal direction thereof. In this condition, the jig-supporting die 32 slightly goes down, alternatively the die 31 slightly elevates, so that the core rod 13 is located at the center of the powder P as shown in FIG. 6(b).

Then, as shown in FIG. 6(c), the lower punch 35 and the jig-supporting die 32 go down to the final loading position, the core rod 13 and each jig 36 go down together with them. The balance of the powder P is loaded in the cavity 33 so as to cover the core rod 13 by the powder P.

B. Compressing Step

As shown in FIG. 6(d), the upper punch 34 enters into the cavity 33 sliding with the inner surface of the jig 36, and the upper and lower punches 34,35 compress the powder P, thereby forming a compact 1. The compressing direction by the upper and lower punches 34, 35 is perpendicular to the core rod 13.

C. Drawing Out Step

As shown in FIG. 6(e), the upper punch 34 (not shown) elevates. Then, the jig-supporting die 32 elevates, alternatively the die 31 goes down, whereby the compact 1 with the core rod 13 and the jigs 36 is drawn out from the die 30. Then, as shown in Jig. 7, the jigs 36 are removed from the core rod 13, and the core rod 13 is drawn out from the compact 1.

According to the third embodiment, the location of the core rod 13 with respect to the cavity 33 is stably kept by the jigs 36 that are supported by the jig-supporting die 32. Therefore, the core rod 13 can be easily located at the neutral zone and the operation for location is facilitated. In the compressing step, the jig-supporting die 32 may be exerted with load via the core rod 13 and the jigs 36. In this case, the jig-supporting die 32 slightly goes down by the effect of the cushioning device. Therefore, the core rod 13 is not exerted with load in compressing, thereby avoiding transformation or break of the core rod 13.

In the above setting step, a part of the powder P is loaded in the cavity 33, the core rod 13 is set by means of the jigs 36, then the balance of the powder P is loaded, thus the powder P is loaded in twice. It should be noted that the loading could be reduced to once, thereby making the step to be simple.

At first, as shown in FIG. 6(b), the jigs 36 containing the core rod 13 is put on the jig-supporting die 32. In that case, the lower punch 35 can be located at the final loading position of the powder P. Then, as shown in FIG. 6(c), the jig-supporting die 32 goes down, thereby locating the core rod 13 supported by the jigs 36 in the cavity 33. Then, as shown in FIG. 6(c), the entire powder P for use is loaded into the cavity, thereby the core rod 13 is covered by the powder P.

After this, the same compact 1 is obtained through a compressing step and a drawing out step as well as the above steps.

(4) Fourth Embodiment

Figure 10:
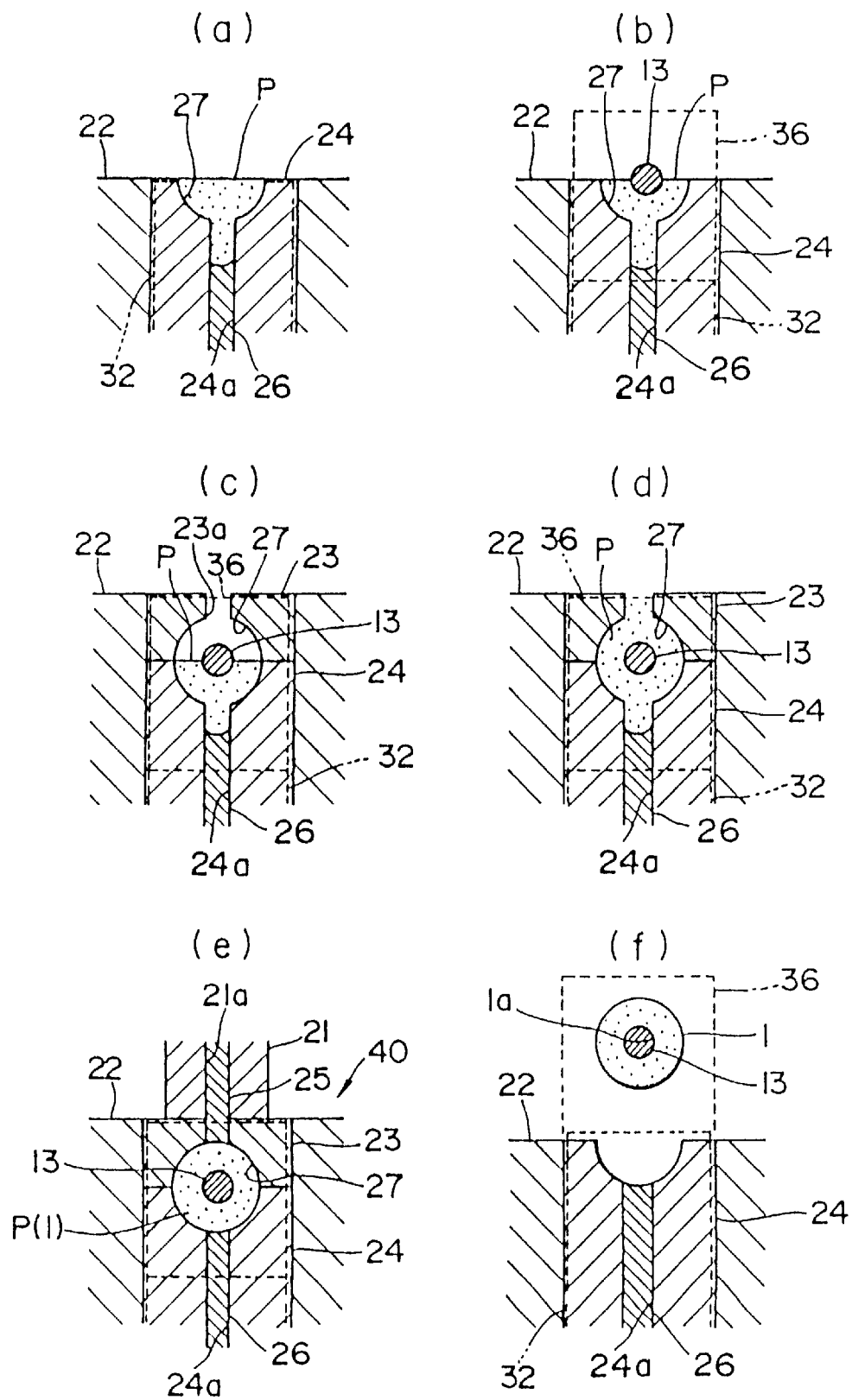
FIG. 10(a) to (f) is a front cross section showing steps in order for forming a compact according to the fourth embodiment.

The fourth embodiment for forming the compact 1 according to the invention will be explained hereinafter. The fourth embodiment uses a combination of the forming apparatus in the second embodiment and the forming apparatus in the third embodiment. As shown in FIG. 10, the forming apparatus equips the upper and lower outer dies 21, 22 and upper and the lower inner dies 23, 24 recited in the second embodiment, and the jig-supporting die 32 recited in the third embodiment. The forming apparatus also equips a die 40 for forming the cavity 27, the upper and lower punches 25, 26 recited in the second embodiment, and the jigs 36 recited in the third embodiment. The jig-supporting die 32 is disposed in the inner side of the lower outer die 22 in a sliding connection. The jigs 36 containing the core rod 13 are put on the jig-supporting die 32. The jig-supporting die 32 is supported by a cushion device such as an air cylinder or a spring so as to elastically goes down as well as the third embodiment.

The steps for forming the compact 1 using the above forming apparatus will be explained hereinafter in order.

A. Setting Step

As shown in FIG. 10(a), the lower inner die 24 and the jig-supporting die 32 elevate to the position where the upper surface thereof coincides with the upper surface of the lower outer die 22. The lower punch 26 elevates to the position where upper end thereof is located below the cavity 27 of the lower inner die 24 and powder is initially loaded. Then a part of the powder P is loaded in the cavity 27 formed by the lower inner die 24, the lower punch 26 and the jig-supporting die 32.

Next, the jigs 36 that are fitted by the end of the core rod 13 respectively are put on the both ends of the jig-supporting die 32 in longitudinal direction thereof (the front and reverse direction of the sheet in FIG. 10). In this condition, the jig-supporting die 32 slightly goes down, alternatively the lower outer die 22 slightly elevates, so that the core rod 13 is located at the center of the powder P as shown in FIG. 10(b). Then, as shown in FIG. 10(c), the lower inner die 24, the lower punch 26 and the jig-supporting die 32 go down to the final loading position, and the upper inner die 23 goes down so as to come into contact with the lower inner die 24.

Next, the balance of the powder P is loaded in the cavity 27 so as to cover the core rod 13 by the powder P.

B. Compressing Step

As shown in FIG. 10(e), the upper outer die 21 goes down so as to come into contact with the upper inner die 23. The upper punch 25 enters into the cavity 27, and the upper and lower punches 25, 26 compress the powder P, thereby forming a compact 1. The compressing direction by the upper and lower punches 25, 26 is perpendicular to the core rod 13.

C. Drawing Out Step

As shown in FIG. 10(f), the upper outer die 21, the upper inner die 23, the upper punch 25 (all not shown), and the jig-supporting die 32 elevates, whereby the compact 1 with the core rod 13 and the jigs 36 is drawn out from the die 40. Then, the jigs 36 are removed from the core rod 13, and the core rod 13 is drawn out from the compact 1.

According to the fourth embodiment, a linear protrusion such as the second embodiment is not formed on the outer surface of the compact, thereby facilitating the finishing after sintering. Also, the location of the core rod 13 with respect to the cavity 27 is stably kept by the jig-supporting die 32 as well as the third embodiment.

In the fourth embodiment, the loading of the powder P could be reduced to once, thereby making the step to be simple. The steps are as follows.

At first, as shown in FIG. 10(b), the jigs 36 containing the core rod 13 are put on the jig-supporting die 32. Then, as shown in FIG. 10(c), the jig-supporting die 32 goes down, thereby locating the core rod 13 supported by the jigs 36 in the cavity 27. Then, as shown in FIG. 10(d), the entire powder P for use is loaded into the cavity 27, thereby the core rod 13 is covered by the powder P.

After this, the same compact 1 is obtained through a compressing step and a drawing out step as well as the above steps.

Figure 11:
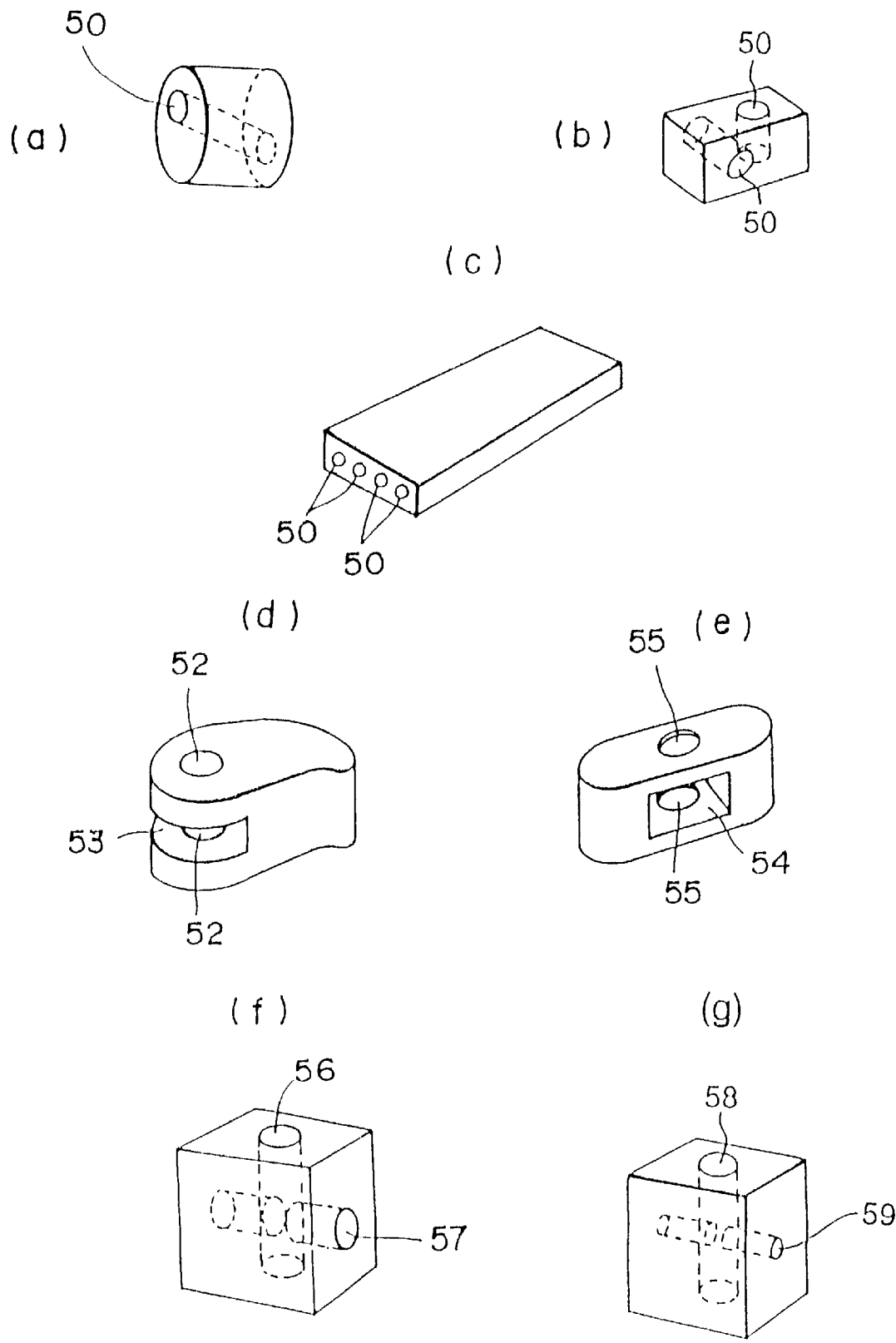
FIG. 11(a) to (g) is a perspective view showing products to which the invention is applied and forms.

The above-mentioned the first embodiment through the fourth embodiment are applied to form the compact 1 shown in FIG. 1. It is needless to say that the scope of the invention is not restricted within the embodiments. The invention can be applied to any products that have hole such as a hole, an abutment or a groove extending cross the compressing direction. FIG. 11 shows such products.

FIG. 11(a) shows a cylindrical body having a hole 50 extending toward a direction inclining with respect to the axial direction. For forming the cylindrical body, as shown in FIG. 9(b), jigs 61 that support an inclining core rod 60 can be used.

FIG. 11(b) shows a rectangular having two holes 50 perpendicularly extending each other. In this case, a core rod such as the core rod 13 can form one of the holes 50.

FIG. 11(c) shows a thin plate having a plurality of holes 50 in parallel.

Figure 12:
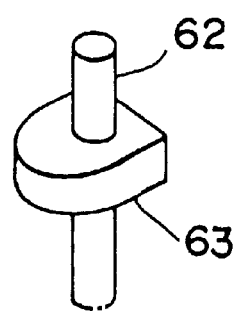
In FIG. 12(a) is a perspective view showing a core preferably used for forming the product shown in FIG. 11(d), (b) is a perspective view showing a core preferably used for forming the product shown in FIG. 11 (e), (c) is a perspective view showing a core preferably used for forming the product shown in FIG. 11(f), (d) is a perspective view showing a core preferably used for forming the product shown in FIG. 11(g).
Figure 12:
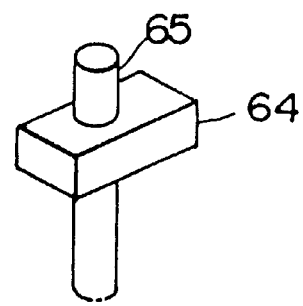
Figure 12:
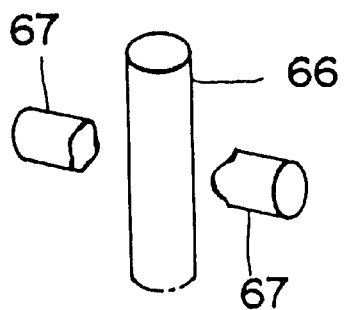
Figure 12:
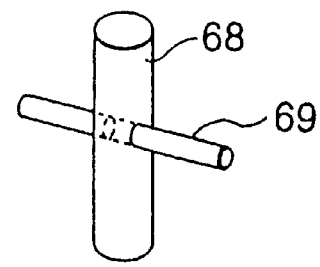

FIG. 11(d) shows a safety locking part with an approximately fuck-shaped plane configuration. The part consists of; a base that is formed with a hole 52 and a transverse groove 53 perpendicularly intersecting the hole 52; and an end portion designed to engage with a counterpart. The safety looking part is rotatably supported by a shaft (not shown) that is inserted into the hole 52. As shown in FIG. 12(a), an ordinary vertical core rod 62 forms the hole 52, a core 63 penetrated by the core rod 62 forms the transverse groove 53. The core 63 is located in a cavity, and does not engage with a die as well as the above embodiments.

FIG. 11(e) shows a rotating part used for housing a bearing (not shown). The part consists of; a hole 54 for housing the bearing; and a pair of holes 55 connected to the hole 55. A shaft supported by the bearing is inserted into the holes 55. As shown in FIG. 12(b), an ordinary vertical core rod 65 forms the holes 55, a core 64 penetrated by the core rod 65 forms the hole 54. The core 64 is located in a cavity, and does not engage with a die as well as the above embodiments.

FIG. 11(f) shows a joint used for laying pipes for fluid. The joint is formed with a vertical hole 56 and a transverse hole 57 intersecting and connecting the vertical hole 56. As shown in FIG. 12(c), an ordinary vertical core rod 66 forms the vertical hole 56. A pair of core rods 67 contacting the outer surface of the vertical core rod 66 forms the transverse hole 57. The transverse core rods 67 are located in a cavity, and do not engage with a die as well as the core rod 13 in the above embodiments.

FIG. 11(g) shows a joint used for laying pipes similarly as the above joint. The diameter of the transverse hole 59 is approximately the half of the diameter of the vertical hole 58. As shown in FIG. 12(d), The vertical hole 58 and the transverse hole 59 are formed by a cross-shaped core rod. The core rod consists of a vertical core rod 68 and transverse core rod 69 that penetrates the vertical core rod 68. The transverse core rod 69 is located in a cavity, and does not engage with a die as well as the core rod 13 in the above embodiments.

The first embodiment through the fourth embodiment is forming methods in which powder is directly formed into a compact by loading and compressing the powder in a die. The fifth embodiment and the sixth embodiment in which powder is compressed into a pre-compressed compact having a lower green density than that of a compact, then the pre-compressed compact is compressed into the compact. These embodiments are applied to the compact 1 having a pipe-shaped body as shown in FIG. 1 as well as the first embodiment through the fourth embodiment.

(5) Fifth Embodiment

Figure 13:
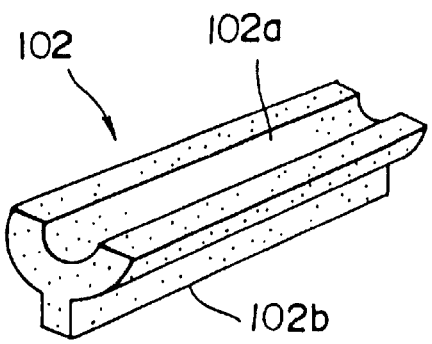
FIG. 13 is a perspective view showing a pre-compressed compact according to the fifth embodiment of the invention.

FIG. 13 shows a pre-compressed compact 102 from which the compact 1 is formed. FIG. 14(a) to (d) shows steps in which a forming apparatus forms the compact 1 by compressing two pre-compressed compacts 102.

Figure 14:
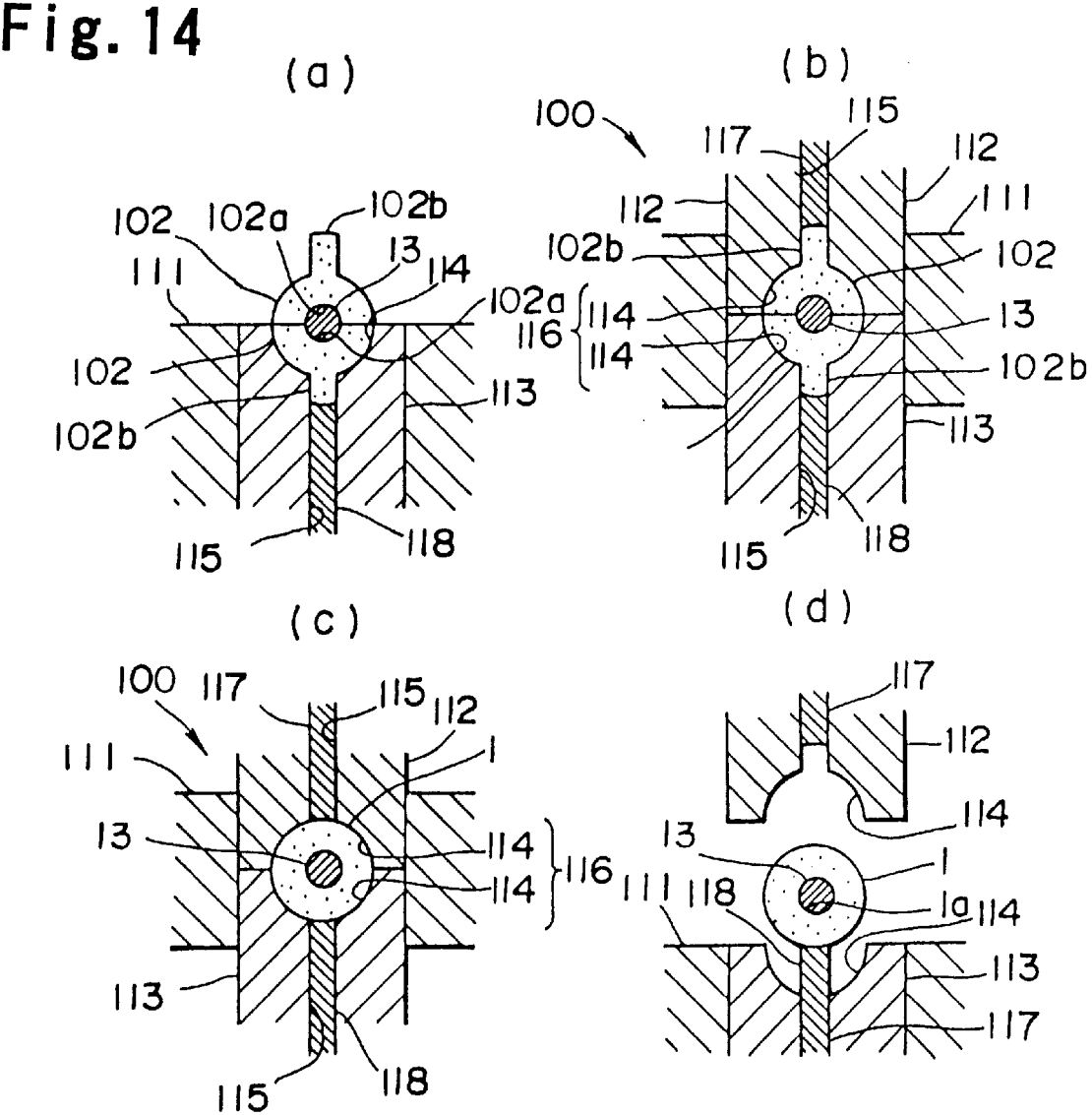
FIG. 14(a) to (d) is a front cross section showing steps in order for forming a compact according to the fifth embodiment.
Figure 15:
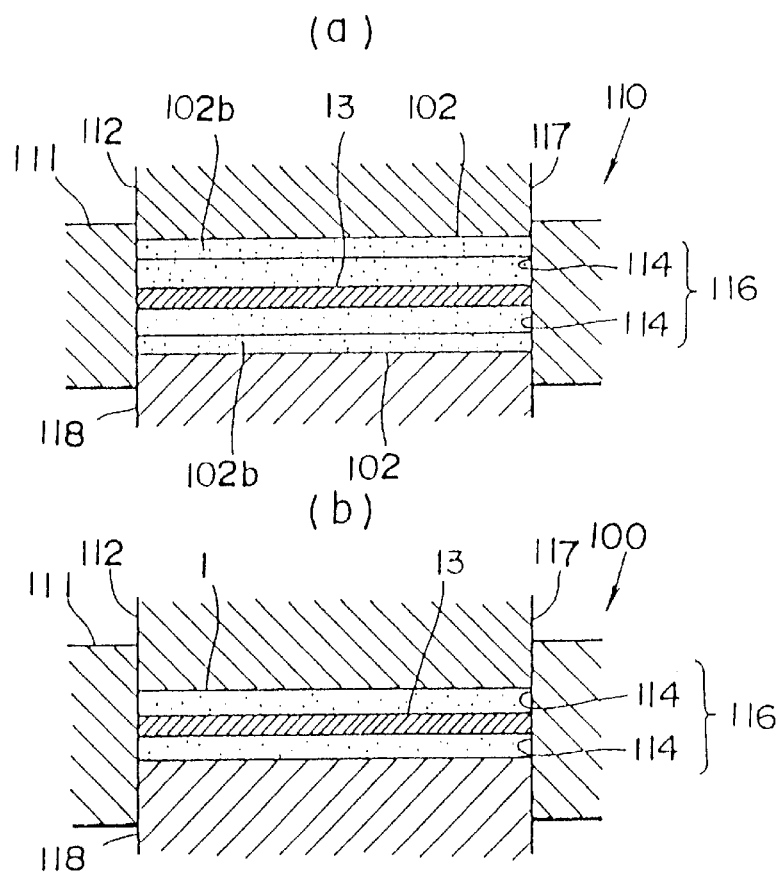
In FIG. 15(a) is a side cross section of FIG. 14(b), (b) is a side cross a section of FIG. 14(c).

At first, the forming apparatus will be explained referring to FIG. 14 showing a front cross section and showing and FIG. 15 a side cross section of the apparatus. In figures, numeral 100 indicates a die. The die 100 comprises an outer die 111 and an upper and lower inner dies 112, 113. The upper inner die 112 is inserted into the outer die 111 from above in a sliding connection, and the lower inner die 113 is inserted into the outer die 111 from the bottom in a sliding condition. The upper and lower dies 112, 113 are capable of coming into contact each other the upper and lower inner dies 112, 113 have the same configuration that is symmetric with respect to the vertical direction. The opposing surfaces of the inner dies 112, 113 are respectively formed with a groove 114 extending along the longitudinal direction (the front and reverse direction of the sheet in FIG. 13) and having a semicircular cross section. Contact surfaces are formed at the both sides in the width direction (the right and left direction in FIG. 13) of the groove 114. A vertically extending insertion hole 115 connected to the groove 114 is formed at the center of the upper and lower inner dies 112, 113 in the width direction. The upper and lower inner dies 112, 113 forms a cavity 116 for forming the compact 1 by contacting each other and unifying the grooves 114. An upper punch 117 and a lower punch 118 enter into the insertion the hole 115 in a sliding connection. The core rod 13 located in the cavity 116 forms the hole 1a of the compact 1. As shown in FIG. 15, the axial length of the core rod 13 is slightly shorter than the length of the cavity 116, so that the core rod 13 is housed in the cavity 116 in such a way that the axial direction of the core rod 13 extends along the longitudinal direction of the cavity 116.

The steps for forming the compact 1 using the forming apparatus will be explained hereinafter in order.

A. Forming Step for Pre-Compressed Compact

A suitable forming apparatus (not shown) forms a pair of pre-compressed compacts 102 shown in FIG. 13. The pre-compressed compact 102 has a configuration formed by halving the compact 1 along the axial direction thereof, and a groove 102a for forming the hole 1a of the compact 1. By joining two cut surfaces of the pre-compressed compacts 102, a similar configuration to the compact 1 is formed. The pre-compressed compact 102 is formed by compressing powder so as to have a green density ratio ranging from 60 to 70%, which density enables handling and bonding each other by the following actual compressing. The outer surface of the pre-compressed compact 102 is formed with an extra wall portion 102b like a linear protrusion extending along the axial direction. The extra wall portion 102b is formed at the center in the circular direction and fits into the insertion hole 115.

B. Setting Step

Two pre-compressed compacts 102 are set in the forming apparatus. In the setting, at first, as shown in FIG. 14(a), the lower inner die 113 enters into the outer die 111, and they elevate to the setting position. The lower punch 118 elevates to the position where upper end thereof is located below the cavity 116(groove 114) of the lower inner die 113. Then, one of the pre-compressed compacts 102 is set in the cavity 116 by fitting the extra wall portion 102b into the insertion hole 115. Then, the core rod 13 is fitted into the groove 102a of the pre-compressed compact 102, and the other pre-compressed compact 102 is assembled with the pre-compressed compact 102 and the core rod 13 by fitting the core rod 13 into the groove 102a. Thus a similar configuration to the compact 1 is obtained. The pre-compressed compact 102 can be handled, so that the above-mentioned operation can be easily preformed by carrying it with a hand. In addition, the extra wall portion 102b is fit into the insertion hole 115, so that the pre-compressed compact 102 can be easily and stably located in the cavity 116.

C. Compressing Step

As shown in FIG. 14(b) and FIG. 15(a), the lower inner die 113 and the lower punch 118 go down to the compressing position. The upper inner die 112 goes down and comes into contact with the lower inner die 113. As a result, the extra wall portion 102b of the upper pre-compressed compact 102 fits into the insertion hole 115 of the upper inner die 112, and the upper pre-compressed compact 102 fits into the cavity 116 (groove 114). Then, as shown in FIG. 14(b), (c) and FIG. 15(a), (b), the upper punch 117 enters into the insertion hole 115 of the upper inner die 112, and the upper and lower punches compress the pre-compressed compacts 102. The compressing direction by the upper and lower punches 117, 118 is perpendicular to the core rod 13.

When the pre-compressed compacts 102 are compressed, each extra wall portion 102b flows to the cylindrical body, according to this, the boundary surfaces of the pre-compressed compacts 102 are intensively compressed each other, thereby bonding each other and forming the compact 1.

D. Drawing Out Step

As shown in FIG. 14(d), the upper inner die 112 and upper punch 117 elevate, thereby separating from the outer die 111. The lower inner die 113 and the lower punch 118 elevates. Then, the lower punch 118 further elevates, whereby the compact 1 with the core rod 13 is drawn out from the lower inner die 113. Then, the core rod 13 is drawn out from the compact 1. In thus obtained compact 1, the stress due to the compression is released when the compact 1 is drawn out from the lower die 113. As a result, a spring back occurs in the compact 1, whereby the core rod 13 is easily drawn out from the compact 1.

According to the fifth embodiment, at first a pair of pre-compressed compacts 102 is formed. Then the pre-compressed compacts 102 are assembled with the core rod 13, and the assembly is set in the cavity 116 of the apparatus and actually compressed, thereby obtaining the final compact 1. According to the method, even though the green density of the pre-compressed compact 102 is not even, the green density is adjusted in the actual compressing, whereby the green density of the compact 1 becomes even and the quality thereof is improved. Moreover, we can manufacture and stock a large amount of the pre-compressed compacts 102, and can form compacts 1 as occasion demands. Therefore, the operation of mixing and loading powder in every forming of the compacts 1 is eliminated, thereby enhancing productivity.

In addition, the core rod 13 that is positioned in the cavity 116 for forming the hole 1a of the compact 1 does not engage with the die 110 and is free from the die 110, so that the core rod 13 can move in the compressing direction with respect to the die 110 in compressing the pre-compressed compact 102. Therefore, in compressing the pre-compressed compact 102, the core rod 13 is not exerted with load that transforms the core rod 13 if it is bonded with the die 110. Hence, troubles such as transformation or damage of the core rod 13 do not occur. Moreover, the core rod 13 is assembled in the pre-compressed compacts 102 that have similar configuration to the compact 1, so that the core rod 1 can be automatically located at the neutral zone, and precise control for locating the core rod 13 at the neutral zone is not required. Thus, the compact 1 can be easily formed.

Figure 6:
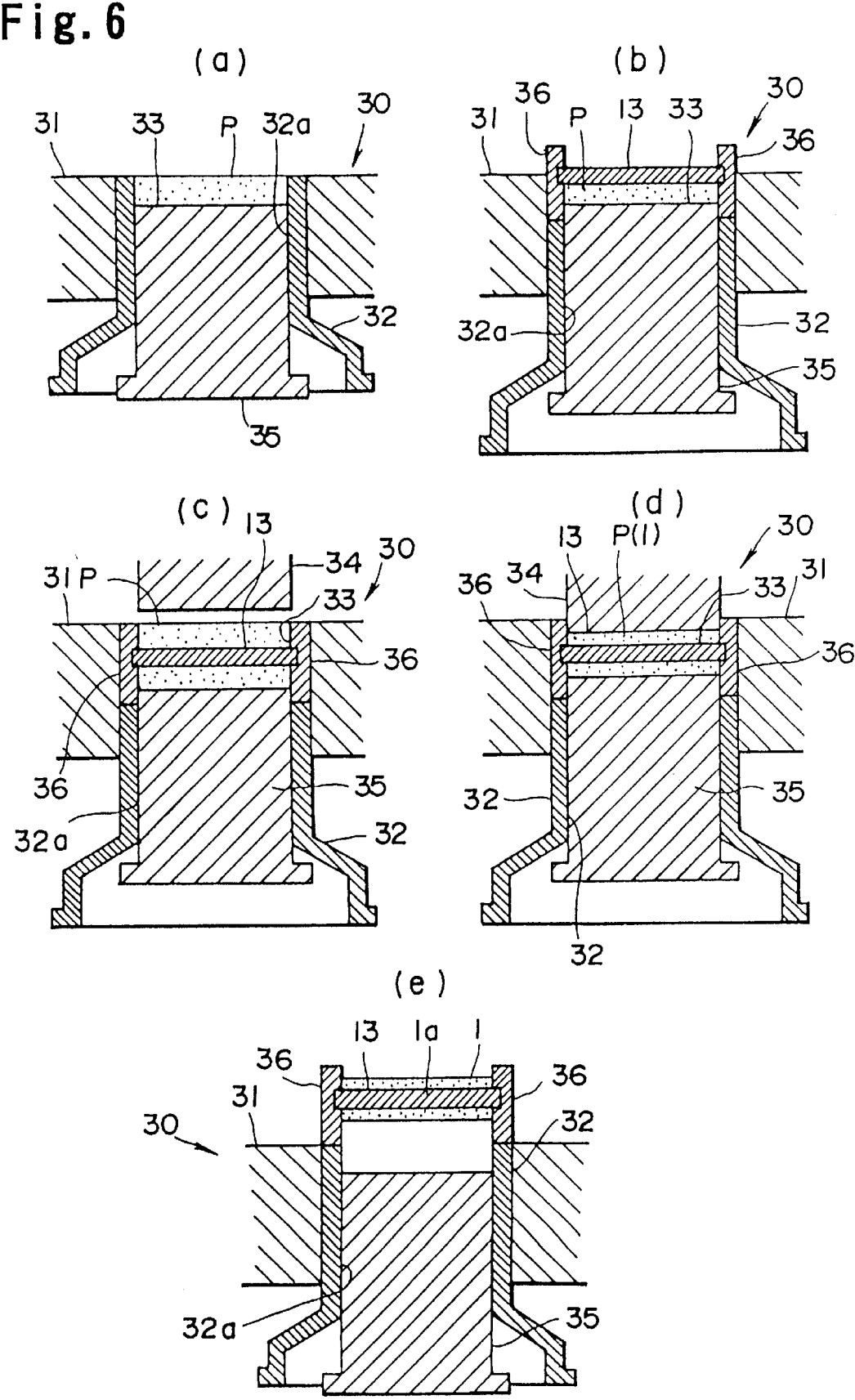
FIG. 6(a) to (e) is a front cross section showing steps in order for forming a compact according to the third embodiment.
Figure 16:
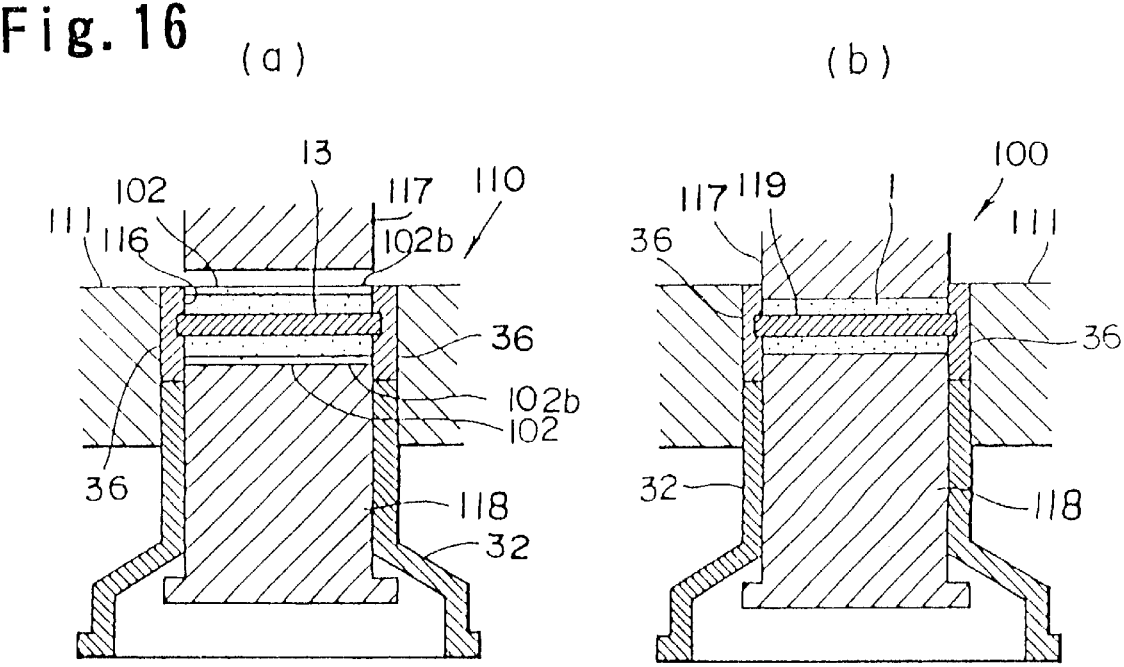
FIG. 16 is a side cross section showing an arrangement of the fifth embodiment.

It should be noted that a pair of the jigs 36 and the jig-supporting die 32 shown in FIG. 6 can be applied to the above forming apparatus, whereby the core rod 13 is stably kept in the cavity 116. FIG. 16 shows the arrangement of the structure, wherein the upper punch 117 is inserted into the jig 36 in a sliding connection, the lower punch 118 is inserted into the jig-supporting die 32 in a sliding connection.

In this construction, at first, the jig-supporting die 32 elevates to the position where the upper end thereof coincides the upper end of the outer die 111, and the lower pre-compressed compact 102 is set in the cavity 116. Then, the each jig 36 into which the end of the core rod 13 is fitted is put on the each end of the jig-supporting die 32, thereby setting the core rod 13. Then, after the upper pre-compressed compact 102 is set on the core rod 13, as shown in FIG. 16(a), the jig-supporting die 32 with the jigs 36 goes down. Furthermore, as shown in FIG. 16(b), the upper punch 117 goes down, thereby compressing the pre-compressed compacts 102 and forming the compact 1. Then, the upper punch 117 and the jig-supporting die 32 elevate, and the compact 1 with core rod 13 and the jigs 36 are removed from the lower inner die 113. Finally, the jigs 36 are drawn out from the core rod 13, and the core rod 13 is drawn out from the compact 1.

According to the above construction, the location of the core rod 13 with respect to the cavity 116 is stably kept by the jigs 36 that are supported by the jig-supporting die 32. In an actual compressing, the jig-supporting die 32 may be exerted with load via the core rod 13 and the jigs 36. As explained in the third embodiment, the jig-supporting die 32 slightly goes down by the effect of the cushioning device. Therefore, the core rod 13 is not exerted with load in compressing, thereby avoiding transformation or break of the core rod 13.

(6) Sixth Embodiment

Figure 17:
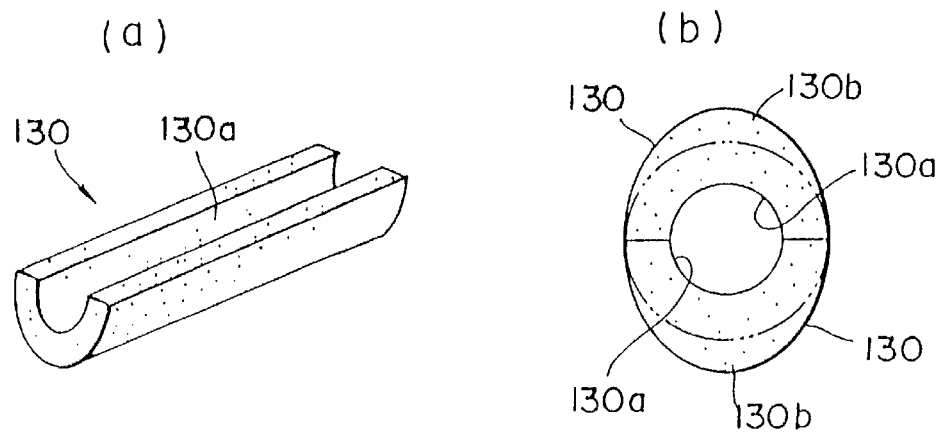

The sixth embodiment according to the invention will be explained hereinafter. FIG. 17(a) shows a pre-compressed compact according to the embodiment. The pre-compressed compact 130 has a configuration formed by halving the compact 1 along the axial direction thereof, as well as the fifth embodiment. Particularly, in the axial cross section of the pre-compressed compact 130, the wall thickness gradually increases toward the center from the both end of the outer surface in the circular direction. As shown in FIG. 17(b), a pair of the pre-compressed compacts 130 presents an oval cross sectional configuration similar to the compact 1, by assembling the compacts 130 opposing the grooves 130a having semicircular cross section. In FIG. 17(b), the two dots chain line indicates the outer profile of the compact 1 after compressing. The crescent portion between the outer profile and the outer profile after actual compressing of the pre-compressed compact 130 is an extra wall portion. The pre-compressed compact 1 has a certain green density that enables easy handling and bonding each other by compressing.

Figure 18:
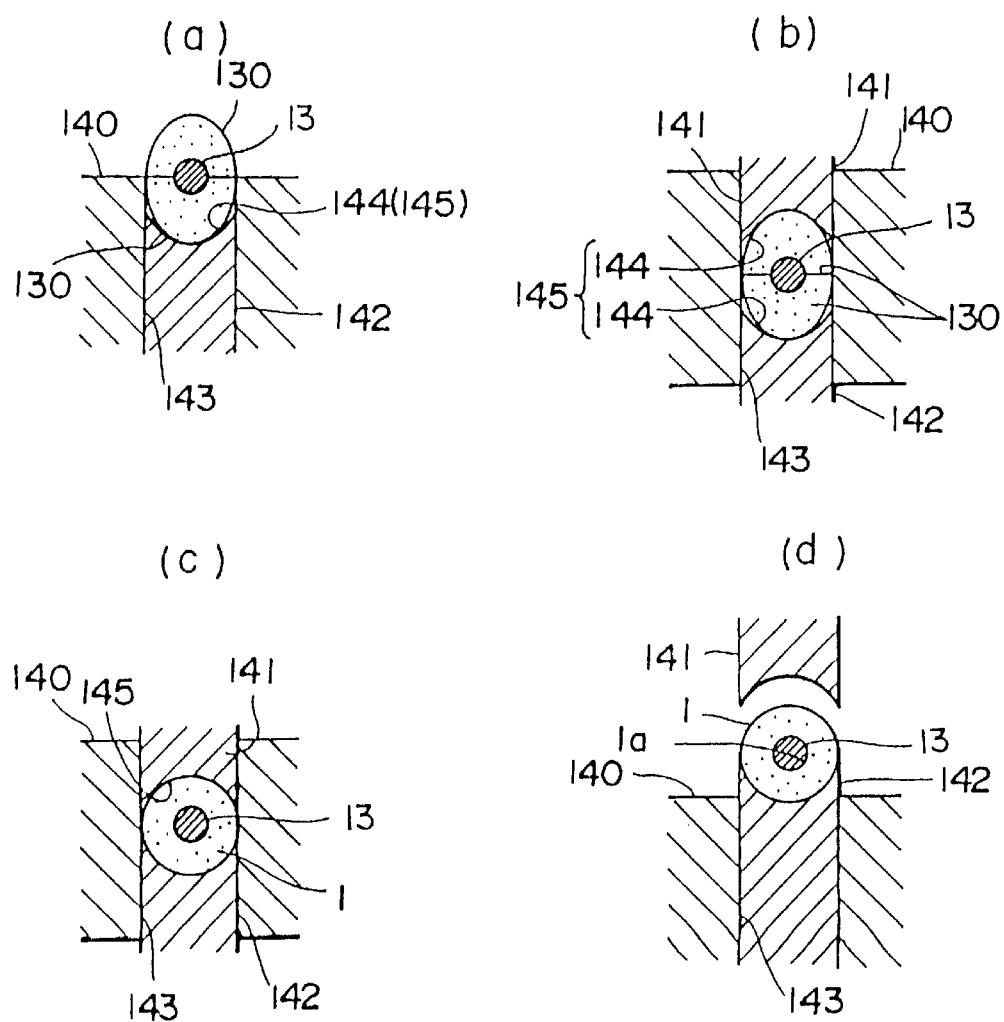
FIG. 18(a) to (d) is a front cross section showing steps in order for forming a compact according to the sixth embodiment.

FIG. 18 shows an apparatus for compressing the pre-compressed compact 130. The apparatus equips a die 140, upper and lower punches 141, 142 and the core rod 13. The die 140 is formed with an insertion hole 143 into which the upper and lower punches 141, 142 are inserted in a sliding connection. The opposing working surfaces of the upper and lower punches 141, 142 are formed with a groove 144 that forms the outer surface of the compact 1. The cross section of the groove 144 has a semicircular shape, and the upper and lower punches 141, 142 and the die 140 forms a cavity 145. More specifically, the both ends (the left side and the right side in FIG. 19) of the upper and lower punches 141, 142 are formed with clearance surfaces 141a, 142a having a certain width respectively so as to prevent collision of the punches 141, 142 or to be hard to break if the punches 141, 142 are in collision with each other.

The steps for forming the compact 1 using the forming apparatus will be explained hereinafter in order.

A. Forming Step for Pre-Compressed Compact

A suitable forming apparatus (not shown) forms a pair of pre-compressed compact 130 having a certain green density enabling handling and bonding each other.

B. Setting Step

The pre-compressed compacts 130 are set in the forming apparatus as shown in FIG. 18(a). In the setting, at first, the lower punch 142 enters into the die 140 and elevates to the setting position. Then, one of the pre-compressed compact 130 is set in the cavity 145 formed by the die 140 and is the lower punch 142 such that the groove 130a faces above. Then, the core rod 13 is inserted in the groove 130a of the pre-compressed compact 130. Finally, other pre-compressed compact 130 is assembled with the core rod 13 to form a similar configuration to the compact 1 by fitting the core rod 13 into the groove 130a of the pre-compressed compact 130.

C. Compressing Step

As shown in FIG. 18(d), the lower punch 142 goes down to the compressing position, and the upper punch 141 goes down and enters into the insertion hole 143, thereby compressing the pre-compressed compacts 130 by the upper and lower punches 141, 142. The compressing direction by the upper and lower punches 141, 142 is perpendicular to the core rod 13. When the pre-compressed compacts 130 are compressed, the extra wall portions 130b is crushed into the cylindrical body, according to this, the boundary surfaces of the pre-compressed compacts 130 are intensively compressed each other, thereby bonding each other and forming the compact 1 as shown in FIG. 18(c).

D. Drawing Out Step

As shown in FIG. 18(d), the upper punch 141 elevates, and the lower punch 142 elevates, thereby drawing out the compact 1 with the core rod 13 from the die 140. Then, the core rod 13 is drawn out from the compact 1, thereby obtaining the compact 1.

Figure 19:
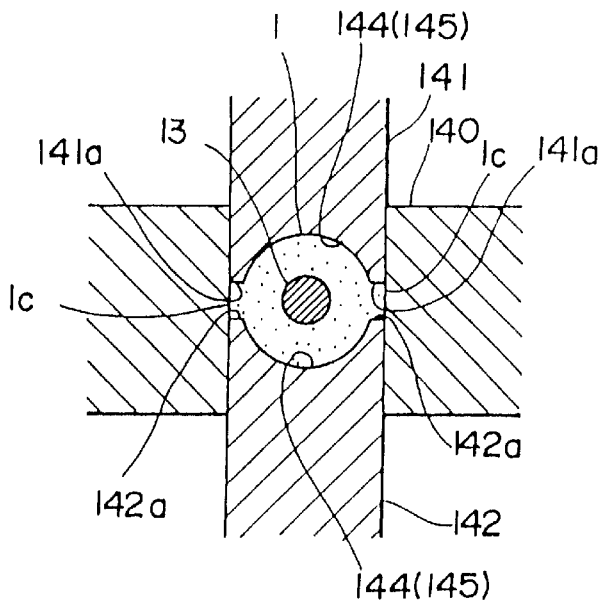
FIG. 19 is a front cross section showing the detail of FIG. 18(c).

Thus obtained compact 1 includes linear protrusions 1c that are formed by the clearance surfaces 141a, 142a formed on the upper and lower punches 141, 142 as shown in FIG. 19. A part of the powder of the pre-compressed compact 130 flows to the space between the clearance surfaces 141a, 142a, and is compressed between them, whereby that portion extends along the axial direction as shown in FIG. 19. The linear protrusions 1c are eliminated after sintering the compact 1 by finishing the sintered body by means of sizing or machining, and the like.

According to the sixth embodiment, the advantages due to compressing the pre-compressed compact 130 and that the core rod 13 is not exerted with load that transforms the core rod 13 in compressing can be obtained as well as the fifth embodiment. Additionally, the extra wall portion 130b is formed on the outer surface of the compact 1 in an oval configuration (crescent configuration in a simple), so that the extra wall portion can be easily flaw to the wall portion of the compact 1, whereby the green density of the compact becomes further even. Therefore, the sixth embodiment is very applicable in the case that the compact 1 has a thin portion.

Figure 20:
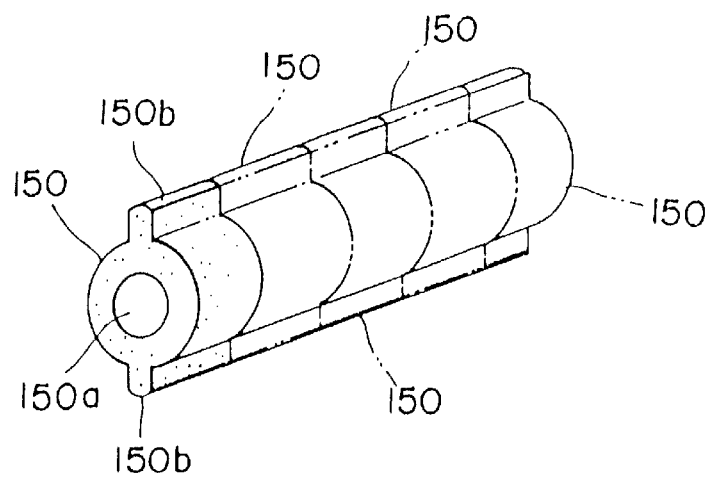
FIG. 20 is perspective view showing another pre-compressed compact.
Figure 21:
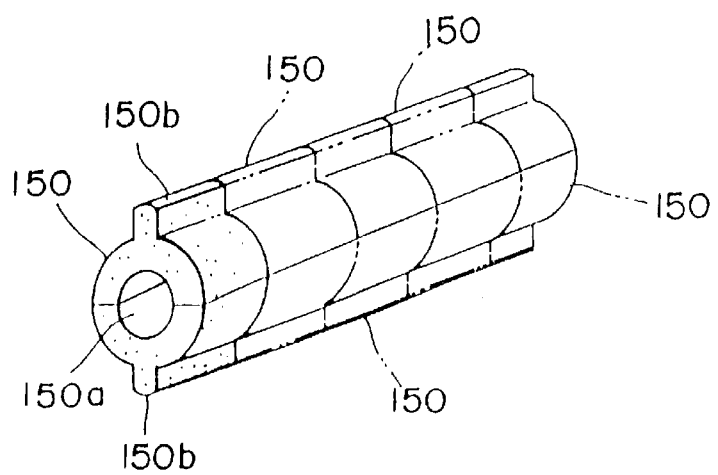
FIG. 21 is perspective view showing an arrangement of the pre-compressed compact shown in FIG. 20.

The pre-compressed compacts 102, 130 in the fifth and sixth embodiments have a configuration formed by halving a cylindrical compact 1 along the axial direction. The invention includes a pre-compressed compact 150 shown in FIG. 20. The pre-compressed compact 150 has a configuration formed by cutting in round slices the compact 1 and forming a hole 150a along the axis and extra wall portions 150b at equally two divided portions along the circular direction of the outer surface. The pre-compressed compacts 150 are arranged in a row and compressed, whereby adjoining compacts 150 bond each other, so that the compact 1 is formed. Alternatively, as shown in FIG. 21, the pre-compressed compacts 150 can be halved along the axis. Configuration and number of the pre-compressed compact may be suitably decided according to the configuration of the compact 1 to be formed.

In addition, the first embodiment through sixth embodiment is applied to the compact 1, which does not limit the invention. The invention can be applied to any products having a hole such as a hole, an abutment, or a groove extending along a direction crossing the compressing direction.

What is claimed is:

1. A method for forming compacts having a hole extending along a direction crossing a compressing direction, the method comprising:

preparing a powder or a pre-compressed compact having a lower green density than a compact to be formed;

setting a core on the powder or the pre-compressed compact in a cavity of a die in a condition that the core can move toward the compressing direction;

compressing the powder or the pre-compressed compact by a punch inserted into the cavity so as to form the compact;

drawing out the compact with the core from the die; and drawing out the core from the compact.

2. A method for forming compacts having a hole extending along a direction crossing a compressing direction according to claim 1, wherein the method further comprises:

loading a part of said powder for forming a compact into said cavity;

setting said core on the powder in a condition that the core can move toward said compressing direction; and loading the balance of the powder into the cavity.

3. A method for forming compacts having a hole extending along a direction crossing a compressing direction according to claim 1, wherein the method further comprises:

setting said core in said cavity; and loading the entire powder for forming a compact into the cavity.

4. A method for forming compacts having a hole extending along a direction crossing a compressing direction according to claim 1, wherein the method further comprises:

forming a plurality of said pre-compressed compacts having a configuration similar to said compact by assembling each other and capable of handling;

assembling the pre-compressed compacts with said core; and bonding the pre-compressed compacts each other by said compressing.

5. A method for forming compacts having a hole extending along a direction crossing a compressing direction according to claim 4, wherein said pre-compressed compact has a green density ratio ranging from 60 to 75%.

6. A method for forming compacts having a hole extending along a direction crossing a compressing direction according to claim 4, wherein said pre-compressed compact has an actual wall portion and an extra wall portion, that is crushed into the actual wall portion by said die in compressing.

7. A method for forming compacts having a hole extending along a direction crossing a compressing direction according to claim 6, wherein said extra wall portion is fitted into an insertion hole of said die.

8. A method for forming compacts having a hole extending along a direction crossing a compressing direction according to claim 1, wherein a pair of jigs is used for stably keeping said core in setting the core.

* * * * *